No. 863,649. PATENTED AUG. 20, 1907.
S. F. ROBINSON.
DISH WASHING APPARATUS.
APPLICATION FILED DEC. 12, 1906.

Witnesses
Carl Stoughton
F. J. Campbell

Inventor
Samuel F. Robinson
By Shepherd & Parker
Attorneys

UNITED STATES PATENT OFFICE.

SAMUEL F. ROBINSON, OF COLUMBUS, OHIO.

DISH-WASHING APPARATUS.

No. 863,649.

Specification of Letters Patent.

Patented Aug. 20, 1907.

Application filed December 12, 1906. Serial No. 347,423.

*To all whom it may concern:*

Be it known that I, SAMUEL F. ROBINSON, a citizen of the United States, residing at Columbus, in the county of Franklin and State of Ohio, have invented certain new and useful Improvements in Dish-Washing Apparatus, of which the following is a specification.

My invention relates to a dish washing apparatus and has for its object the provision of a device of this character which may be cheaply manufactured and which is adapted to accommodate a large or small number of dishes.

A further object of the invention is the provision of a device of the character described which is adapted to effectually drain the dishes after they have been washed.

Figure 1:
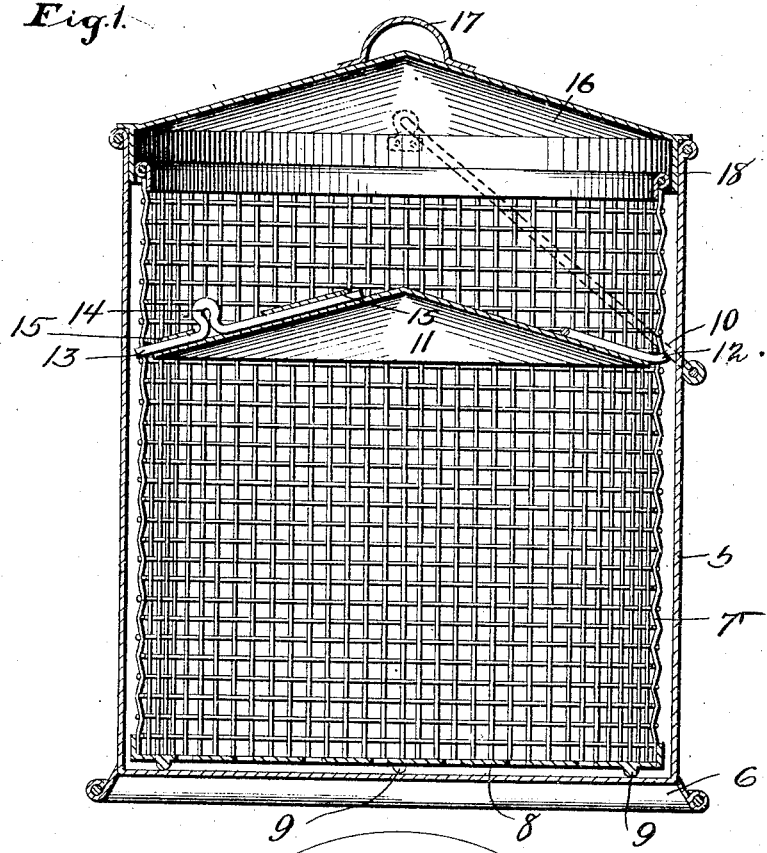
Figure 2:
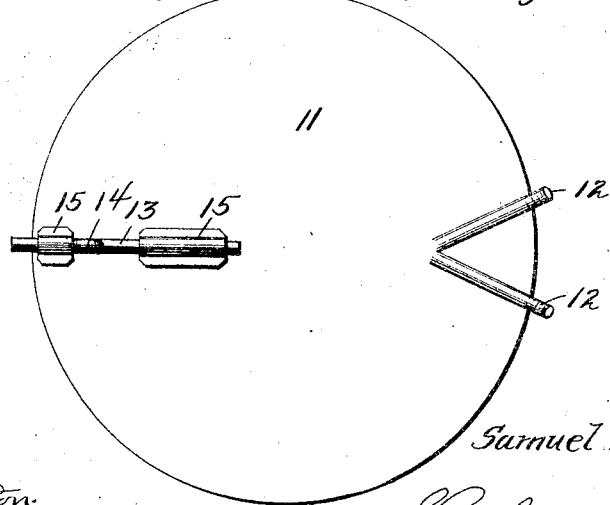

Further objects and advantages of the invention will be set forth in the detailed description which now follows:

In the accompanying drawing: Figure 1 is a vertical section of a dish washing apparatus constructed in accordance with the invention, and, Fig. 2 is a plan view of a top for the inner screen.

Like numerals designate corresponding parts in both of the figures of the drawing.

Referring to the drawing, the numeral 5 designates a metallic pail-like receptacle which is mounted upon a base flange 6. This receptacle is adapted to receive a cage 7 which is constructed of wire mesh and which is provided with a metallic perforated bottom 8. This cage is provided with lugs 9 which serve to space it from the receptacle 5. A handle 10 of the usual and well known construction is secured to the receptacle 5 and provides means for imparting a bodily oscillatory movement to the larger receptacle, as will be hereinafter set forth.

A cap plate 11 which is preferably conical, is adapted to hold dishes in the cage 7 to prevent the dishes from rattling about and consequently from striking each other with such force as to break said dishes. This top 11 has been illustrated in plan view in Fig. 2 and by referring to said figure, it will be seen that hooks 12 are formed upon the outer ends of a V-shaped wire and that a bolt 13 having a handle 14 is slidably disposed in keepers 15 which are carried by the top. A cover 16 which is provided with a handle 17 forms a closure for the receptacle 5.

The operation of the device is as follows: The dishes are placed in the cage 7, after which boiling water is poured over them. After a sufficient amount of boiling water has been poured over these dishes, the top 11 is secured in position by placing said top in such position that the hooks 12 hook through the mesh of the cage 7 at one side of the top. The top is then pressed firmly down upon the dishes, after which the bolt 13 is moved in position to engage the wire mesh at the opposite side of the top. It will therefore be seen that this top is adapted to be secured in position at such point as to hold the dishes against movement with relation to each other, whether there be a large number of dishes or only a few of them. After this top 11 has been placed in position, the top 17 is placed upon the receptacle 5, said top having a flange 18 which passes inside of said receptacle. The operator then grasps the handle 10 and imparts a bodily oscillatory movement to the receptacle 5. This sets up a circulation of water inside of said receptacle and thoroughly cleanses the dishes contained in the cage. After the dishes have been sufficiently washed, the cage 7 may be removed and the water permitted to drain from the dishes either by placing the cage 7 in the sink or by turning the cage partly upon its side and placing it over the top of the receptacle 5.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

What I claim, is:

1. The combination with a receptacle, of a wire mesh cage which is adapted to be secured within said receptacle, a top adapted to fit within said cage, fixed members carried by the top at one side thereof for engaging said wire mesh, and a sliding bolt carried by the other side of said top also adapted to engage the wire mesh.

2. The combination with a receptacle, of a wire mesh cage which is adapted to be secured within said receptacle, a top adapted to fit within said cage, fixed members carried by the top at one side thereof for engaging said wire mesh, a sliding bolt carried by the other side of said top also adapted to engage the wire mesh, and means for spacing said cage from the bottom of the receptacle.

In testimony whereof I affix my signature in presence of two witnesses.

SAMUEL F. ROBINSON.

Witnesses:
GEO. F. LITTLE,
GRACE A. EARICH.